Patented Oct. 21, 1952

2,615,040

UNITED STATES PATENT OFFICE 2,615,040

SYNTHESIS OF FOLIC ACID INTERMEDIATES

David I. Weisblat and Barney J. Magerlein, Kalamazoo, Mich., assignors to The Upjohn Company, Kalamazoo, Mich., a corporation of Michigan No Drawing. Application August 19, 1950, Serial No. 180,509

5 Claims. (Cl. 260—470)

This invention relates to a process for the preparation of certain N-(2,3-dioxyalkyl)-p-aminobenzoate compounds and to certain new compounds prepared thereby.

The N-(2,3-dioxyalkyl)-p-aminobenzoate compounds which can be prepared by the method of the invention have the generic formula

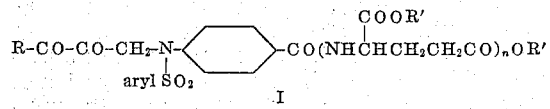

N-(2,3-dioxyalkyl)-p-aminobenzoate compound wherein R' is a member of the class consisting of hydrogen and the alkyl radicals, R is a member of the class consisting of hydrogen and the alkyl radicals and $n$ is a member of the class consisting of zero and the positive integers 1 to 7, inclusive. Certain of the compounds mentioned herein are described and claimed, and another method for their preparation is given, in copending application Serial No. 63,454, filed December 3, 1948, now Patent No. 2,578,767.

In the naming of compounds mentioned herein where both a glutamic acid residue and a p-aminobenzoic residue are included in the molecule, the nitrogen atom of the glutamic acid residue is, for convenience, referred to by the symbol "N'" and the nitrogen atom of the p-aminobenzoic acid residue is referred to by the symbol "N." In the structural formulae given herein and in the appended claims, aromatic nuclei are represented by one or more simple hexagons. As indicated by the generic formula given, compounds containing more than one glutamic acid or ester residue contemplated by the invention are those wherein only the gamma carboxy groups are involved in the peptide linkages. Preferred compounds used in or prepared by the method of the invention are those wherein $n$ of the generic formula given is 1 and wherein the arylsulfonyl radical is the p-toluenesulfonyl radical. The method will be described with particular reference to such preferred compounds, it being understood, however, that the invention is not limited thereby.

According to the method of the invention an N-(2,3-dioxyalkyl)-p-aminobenzoate compound is prepared by oxidizing an N-(2-ketoalkyl)-p-aminobenzoate compound having the formula

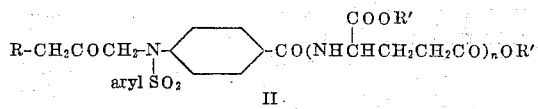

N-(2-ketoalkyl)-p-aminobenzoate compound with selenium dioxide. The reaction is conveniently carried out by heating a mixture of an N-(2-ketoalkyl)-p-aminobenzoate compound and selenium dioxide in a solvent for the ketoalkyl compound which is inert under the reaction conditions. Inert solvents which can be used are chlorobenzene, glacial acetic acid, toluene and many others. The mixture is generally heated at from about 80° C. or lower to about 150° C. or higher although the actual temperature of heating is not particularly critical. The mixture is usually heated for from about two to about forty hours or longer, depending upon the temperature. A considerable excess of selenium dioxide over that theoretically necessary to oxidize the 2-ketoalkyl compound to the 2,3-dioxyalkyl compound is generally employed. During the reaction selenium dioxide is reduced to elemental selenium.

Following the oxidation step the mixture can be filtered to remove elemental selenium and excess selenium dioxide and the inert diluent evaporated under reduced pressure. The N-(2,3-dioxyalkyl)-p-aminobenzoate compound is thus obtained as a residue which is generally in the form of a viscous yellowish oil and which is usually pure enough for most uses without further purification.

The method of the invention is of particular value because of the ease with which compounds prepared by the method can be converted to compounds similar to or identical with certain naturally occurring compounds of the folic acid group. Thus, as described and claimed in the copending application, Serial No. 63,454, diethyl N'-(N-(2-formyl-2-ketoethyl)-N-(p-toluenesulfonyl)-p-aminobenzoyl)-glutamate, which can be prepared in superior yield by the method of the invention, can be condensed with 2,4,5-triamino-6-hydroxypyrimidine to form diethyl N'-(N-((2-amino-4-hydroxy-6-pteridyl)-methyl)-N-(p-toluenesulfonyl)-p-aminobenzoyl)-glutamate. The latter compound upon treatment with anhydrous hydrogen bromide in an aliphatic acid medium, and in the presence of a bromine acceptor to prevent bromination of the benzene nucleus of the p-aminobenzoic acid residue according to the method described and claimed in copending application, Serial No. 41,883, filed July 31, 1948, now Patent No. 2,562,222, and after subsequent hydrolysis of the ester groups, is converted to N'-(N-((2-amino-4-hydroxy-6-pteridyl)-methyl)-p-aminobenzoyl)-glutamic acid (pteroylglutamic acid), generally recognized, when the glutamic acid residue has the same configuration as 1(+) glutamic acid, as being identical with the "L. casei factor" or vitamin $B_c$ from liver, sometimes referred to as a "folic acid." In similar fashion other N-(2-formyl-2-ketoethyl)-p-aminobenzoate compounds can be condensed with 2,4,5-triamino-4-hydroxypyrimidine to form compounds of the folic acid type. Furthermore, compounds having the formula (I) wherein R is an alkyl radical when reacted with 2,4,5-triamino-6-hydroxypyrimidine, lead readily to the formation of compounds having a pteridine radical with an alkyl substituent on the 7 carbon atom. Such substituted compounds, which have not heretofore been described, appear to be physiologically active.

Although the invention will be described with particular reference to starting and final compounds wherein the arylsulfonyl radical is the p-toluenesulfonyl radical, it is understood that the invention contemplates the use and preparation of compounds containing other arylsulfonyl radicals, such as the o-toluenesulfonyl, benzenesulfonyl and naphthalenesulfonyl radicals. Arylsulfonyl radicals having substituents, such as chlorine, bromine or nitro groups, on the aromatic nucleus can also be used, provided only that the substituent is non-reactive under the reaction conditions. The preferred arylsulfonyl radical is the p-toluenesulfonyl radical because the compounds formed are generally well defined crystalline solids and because it has been found that higher yields of amines are often formed when the p-toluenesulfonylamino compound is split than when certain other arylsulfonylamino radicals are split. Compounds containing other acyl radicals, such as the formyl, acetyl, propionyl, methanesulfonyl, cyclohexanesulfonyl and alpha-toluenesulfonyl radicals, can also be employed in the process, if desired, and the corresponding acyl N-(2,3-dioxyalkyl)-p-aminobenzoate compounds prepared.

Although the ester residues present in the compounds used in or prepared by the method of the invention can comprise an alkyl ester such as the methyl, ethyl, n-propyl, iso-propyl, n-butyl, tert.-butyl, amyl, lauryl, dodecyl and many other esters, the preferred ester is the ethyl ester due to matters of convenience and economy. Although the invention is directed particularly to alkyl esters, the process of the invention can also be carried out and the corresponding compounds prepared using other esters such as the phenyl, tolyl, xylyl, cyclohexyl, benzyl and many other aryl, aralkyl and cycloalkyl esters.

An N-(2-ketoalkyl)-p-aminobenzoate compound (II) useful as a starting compound in the method of the invention can be prepared conveniently, as described and claimed in concurrently filed copending application Serial No. 180,507, by oxidation of an N-(2-hydroxyalkyl)-p-aminobenzoate compound having the formula

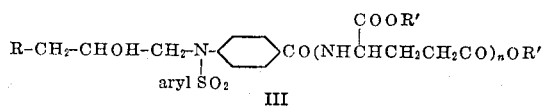

III

N-(2-hydroxyalkyl)-p-aminobenzoate compound

The hydroxyalkyl compound can be prepared conveniently by heating an N-(arylsulfonyl)-p-aminobenzoate ester compound (IV) having the formula

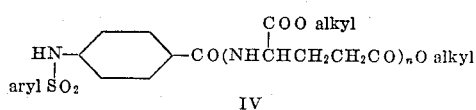

IV

N-(arylsulfonyl)-p-aminobenzoate ester compound with a 1,2-epoxyalkane in the presence of a catalytic amount of a tertiary amine, such as pyridine, triethyl amine and the like. The product can be hydrolyzed to the free acid.

Certain of the N-(arylsulfonyl)-p-aminobenzoate compounds are described and claimed in copending application, Serial No. 41,888, filed July 31, 1948. They can be prepared readily as described therein by reacting an arylsulfonyl halide with p-aminobenzoic acid, N'-(p-aminobenzoyl)-glutamic acid, or an N'-(p-aminobenzoyl)-glutamyl-glutamic acid having up to seven glutamic acid residues in the molecule or with an alkyl ester thereof. N-(arylsulfonyl)-p-aminobenzoate compounds which are esters can be hydrolyzed readily to the free acids with alkalies and the free acids can be esterified in conventional manner.

Certain advantages of the invention are apparent from the following examples which are given by way of illustration only and are not to be construed as limiting.

*Example 1.—Diethyl N'-(N-(p-toluenesulfonyl)-p-aminobenzoyl)-glutamate*

Thirty and nine-tenths grams of p-toluenesulfonyl-p-aminobenzoyl chloride and 23.9 grams of diethyl 1(+)-glutamate hydrochloride were dissolved in 300 milliliters of ethylene dichloride and the solution cooled to between 0° and 10° C. The cold solution was stirred vigorously and 22.3 grams of triethylamine in 72 milliliters of ethylene dichloride was added slowly over a period of about 20 minutes. The temperature of the mixture was held between 10° and 20° C. during the addition of the triethylamine and the mixture then allowed to stand at room temperature for one hour. The mixture was then washed successively with water, dilute hydrochloric acid, saturated aqueous sodium bicarbonate and finally with water. The colorless solution thus obtained was dried with anhydrous sodium sulfate and naphtha was added until the oslution became opalescent. The mixture was then cooled to cause crystallization and filtered. The crystals, after drying, consisted of 36 grams of diethyl N'-(N-(p-toluenesulfonyl)-p-aminobenzoyl)-1-glutamate melting at 124° to 126° C.

*Example 2.—Diethyl N'-(N-(2-hydroxypropyl)-N-(p-toluenesulfonyl)-p-aminobenzoyl)-glutamate*

A mixture of 6.38 grams of propylene oxide, 47.7 grams of diethyl N'-(N-(p-toluenesulfonyl)-p-aminobenzoyl)-glutamate and 10 drops of anhydrous pyridine was heated under pressure at 130° C. for 2 hours. The reaction mixture was then cooled to room temperature, 400 milliliters of benzene were added and the resulting benzene solution was washed with 50 milliliters of water and 50 milliliters of dilute hydrochloric acid and then dried. Removal of the solvent under reduced pressure gave a non-crystalline solid residue of diethyl N'-(N-(2-hydroxypropyl)-N-(p-toluenesulfonyl)-p-aminobenzoyl)-glutamate.

In a similar manner, and using 1,2-epoxy-n-butane or 1,2-epoxy-4-methyl-n-pentane in place of 1,2-epoxypropane, there are formed diethyl N'-(N-(2-hydroxy-n-butyl)-N-(p-toluenesulfonyl)-p-aminobenzoyl)-glutamate and diethyl N'-(N-(2-hydroxy-4-methyl-n-pentyl)-N-(p-toluenesulfonyl) p-aminobenzoyl)-glutamate, respectively, which upon hydrolysis, give the corresponding acids.

The use of ethyl N-(benzenesulfonyl)-p-aminobenzoate or of triethyl N'-(N-(p-chlorobenzenesulfonyl)-p-aminobenzoyl)-glutamyl-glutamate in place of diethyl N'-(N-(p-toluenesulfonyl)-p-aminobenzoyl)-glutamate leads, in analogous manner, to the formation of ethyl N-(2-hydroxypropyl)-N-(benzenesulfonyl)-p-aminobenzoate and triethyl N'-(N-(2-hydroxypropyl)-N-(p- chlorobenzenesulfonyl) - p - aminobenzoyl) -glutamyl - glutamate, respectively. These esters, upon hydrolysis with dilute alcoholic sodium hydroxide, are converted to N-(2-hydroxypropyl)-N-(benzenesulfonyl)-p-aminobenzoic acid, and N'-(N-(2 - hydroxypropyl)-N-(p-chlorobenzenesulfonyl) - p - aminobenzoyl)-glutamyl-glutamic acid, respectively. The free acids mentioned, upon esterification with an alkanol or with other alkyl ester-forming agents, are converted to the corresponding alkyl esters.

Upon treating the 2-hydroxyalkyl compounds mentioned which are arylsulfonyl derivatives with hydrogen bromide according to the procedure described in the copending application previously referred to, the arylsulfonyl radical is split from the molecule leaving the corresponding 2-hydroxyalkylamino compound. The latter, upon reaction with an arylsulfonyl halide in substantially conventional fashion, are converted readily to the corresponding arylsulfonyl derivatives of the amine.

*Example 3.—Diethyl N'-(N - (2 - ketopropyl) -N-(p - toluenesulfonyl) -p - aminobenzoyl) -glutamate*

The crude diethyl N'-(N-(2-hydroxypropyl) -N-(p - toluenesulfonyl) -p-aminobenzoyl) -glutamate obtained in Example 2 was dissolved in 400 milliliters of benzene and the solution was added with vigorous stirring to a solution consisting of 52.6 grams of potassium dichromate, 230 milliliters of water, 38 milliliters of acetic acid and 69 milliliters of sulfuric acid. The mixture was stirred vigorously at 20° to 25° C. for about 2½ hours, cooled and the benzene and aqueous layers separated. The aqueous layer was extracted twice with 100-milliliter portions of benzene and then discarded, the benzene extracts being added to the benzene layer from the reaction mixture. The combined benzene solutions were washed three times with 250-milliliter portions of water, once with 100 milliliters of saturated aqueous sodium bicarbonate solution, twice with 250-milliliter portions of water and once with 100 milliliters of saturated aqueous sodium chloride solution. The washed benzene solution was then dried and the solvent distilled under reduced pressure. The residue was dissolved in hot iso-propanol and the solution allowed to crystallize at room temperature. The mixture was filtered and the crystals dried. There were thus obtained 34.5 grams of crude diethyl N'-(N-(2-ketopropyl)-N-(p - toluenesulfonyl) -p-aminobenzoyl) -glutamate which melted at 88° to 130° C. Recrystallization of the crude ketone raised its melting point from 99° to 125° C.

Oxidation in a similar manner of diethyl N'-(N - (2 - hydroxy - n - butyl) - N - (p - toluenesulfonyl) - p - aminobenzoyl) - glutamate, diethyl N' - (N - (2-hydroxy-4-methyl-n-pentyl)-N-(p - toluenesulfonyl) -p-aminobenzoyl) -glutamate, N'-(N-(2-hydroxy-n-butyl) -N-(p-toluenesulfonyl) -p-aminobenzoyl) -glutamic acid, N-(2-hydroxypropyl) -N-(benzenesulfonyl) -p - aminobenzoic acid, ethyl N-(2-hydroxypropyl)-N-benzenesulfonyl) -p-aminobenzoate, triethyl N'-(N-(2 - hydroxypropyl) - N - (p - chlorobenzenesulfonyl) -p-aminobenzoyl) -glutamyl-glutamate and N'-(N-(2-hydroxypropyl) - N - (p-chlorotoluenesulfonyl) - p - aminobenzoyl) -glutamyl-glutamic acid gives diethyl N'-(N-(2-keto-n-butyl) -N-(p-toluenesulfonyl) -p-aminobenzoyl) -glutamate, diethyl N'-(N-(2 - keto - 4 - methyl-n-pentyl)-N-(p-toluenesulfonyl) -p-aminobenzoyl) -glutamate, N'-(N - (2-keto-n-butyl) -N-(p-toluenesulfonyl) - p-aminobenzoyl) -glutamic acid, N-(2-ketopropyl) -N-(benzenesulfonyl) -p-aminobenzoic acid, ethyl N-(2-keto-propyl) -N-(benzenesulfonyl) -p-aminobenzoate, triethyl N'-(N-(2-keto-propyl) - N-(p - chlorobenzenesulfonyl) -p-aminobenzoyl) - glutamyl-glutamate and N'-(N-(2-ketopropyl) - N-(p - chlorotoluenesulfonyl) -p-aminobenzoyl) - glutamyl-glutamic acid, respectively.

*Example 4.—Diethyl N'-(N-(2-formyl - 2 - ketoethyl) -N-(p - toluenesulfonyl) - p - aminobenzoyl) -glutamate*

A mixture of 1.0 gram of diethyl N'-(N-(2-ketopropyl) - N - (p - toluenesulfonyl) -p-aminobenzoyl) -glutamate, 0.21 gram of selenium dioxide, 12 milliliters of chlorobenzene and 3 milliliters of glacial acetic acid was heated under reflux for two hours, cooled, the solids filtered from the solution and the solvent removed under reduced pressure. There was thus obtained 1.0 gram of diethyl N'-(N-(2-formyl-2-ketoethyl) -N-(p-toluenesulfonyl) -p-aminobenzoyl) - glutamate as a viscous yellow oil.

*Example 5.—Diethyl N'-(N-(2-formyl - 2 - ketoethyl) - N - (p - toluenesulfonyl) -p-aminobenzoyl) -glutamate*

A mixture of 1.0 gram of diethyl N'-(N-(2-ketopropyl) - N - (p - toluenesulfonyl) -p-aminobenzoyl) -glutamate, 0.21 gram of selenium dioxide and 15 milliliters of ethanol was heated under reflux for forty hours, cooled and the product isolated as described in Example 4. There was thus obtained 1.0 gram of crude diethyl N'-(N-(2-formyl - 2 - ketoethyl) -N-(p-toluenesulfonyl) -p-aminobenzoyl) -glutamate as a viscous yellow oil.

In a similar manner N'-(N-(2-ketopropyl)-N - (p-toluenesulfonyl) -p-aminobenzoyl) - glutamic acid, diethyl N'-(N-(2-keto-n-butyl) -N-(p-toluenesulfonyl) -p-aminobenzoyl) -glutamate, diethyl N'-(N-(2-keto - 4 -methyl-n-pentyl) -N-(p-toluenesulfonyl) -p-aminobenzoyl) -glutamate, N'-(N-(2-keto-n-butyl) -N-(p - toluenesulfonyl) - p-aminobenzoyl) -glutamic acid, N-(2-ketopropyl) -N-(benzenesulfonyl) -p-aminobenzoic acid, ethyl N-(2 - ketopropyl) -N-(benzenesulfonyl) -p-aminobenzoate, triethyl N'-(N-(2-ketopropyl) - N-(p - chlorobenzenesulfonyl) -p-aminobenzoyl) - glutamyl-glutamate and N'-(N-(2-ketopropyl) - N - (p-chlorobenzenesulfonyl) -p-aminobenzoyl) - glutamyl-glutamic acid are oxidized with selenium dioxide to form N'-(N-(2-formyl-2-ketoethyl) -N-(p - toluenesulfonyl) -p-aminobenzoyl) - glutamic acid, diethyl N'-(N-(2,3-diketo-n-butyl) -N-(p - toluenesulfonyl) - p - aminobenzoyl) - glutamate, diethyl N'-(N-(2,3-diketo-4-methyl-n-pentyl) - N - (p-toluenesulfonyl) -p-aminobenzoyl) -glutamate, N'-(N-(2,3-diketo-n-butyl) -N-(p-toluenesulfonyl) -p-aminobenzoyl) - glutamic acid, N-(2-formyl-2-ketoethyl) -N-(benzenesulfonyl) -p-aminobenzoic acid, ethyl N-(2-formyl-2 - ketoethyl) - N-(benzenesulfonyl) - p - aminobenzoate, triethyl N'-(N-(2-formyl-2-ketoethyl)-N-(p - chlorobenzenesulfonyl) -p-aminobenzoyl) - glutamyl - glutamate and N'-(N-(2-formyl-2-ketoethyl) - N - (p - chlorobenzenesulfonyl) - p - aminobenzoyl) -glutamyl-glutamic acid, respectively.

We claim:

1. The method which includudes: oxidizing a compound having the formula

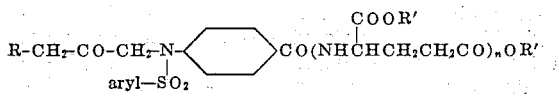

wherein R' is a member of the class consisting of hydrogen and the alkyl radicals, $n$ is a member of the class consisting of zero and the positive integer 1 and R is a member of the class consisting of hydrogen and the alkyl radicals with selenium dioxide to form a compound having the formula

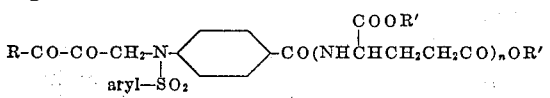

wherein R', R and $n$ have the values given.

2. The method of claim 1 wherein $n$ is the integer 1.

3. The method of claim 1 wherein the arylsulfonyl radical is the p-toluenesulfonyl radical.

4. The method of claim 1 wherein R is hydrogen.

5. The method of claim 1 wherein the compound oxidized is diethyl N'-(N-(2-ketopropyl)-N-(p-toluenesulfonyl)-p-aminobenzoyl)-glutamate.

DAVID I. WEISBLAT.
BARNEY J. MAGERLEIN.

No references cited.